United States Patent [19]

Onandia

[11] Patent Number: 5,641,409
[45] Date of Patent: Jun. 24, 1997

[54] METHOD FOR FILTERING LIQUIDS CONTAINING PARTICLES IN SUSPENSION

[75] Inventor: Carmelo Onandia, Vizcaya, Spain

[73] Assignee: Ona Electro-Erosion, S.A., Spain

[21] Appl. No.: 376,232

[22] Filed: Jan. 23, 1995

Related U.S. Application Data

[60] Continuation-in-part of Ser. No. 81,555, Jun. 23, 1993, abandoned, which is a division of Ser. No. 891,214, May 29, 1992, abandoned.

[51] Int. Cl.$^6$ ............................................. B01D 21/32
[52] U.S. Cl. .................. 210/739; 73/61.65; 73/61.69; 210/94; 210/123; 210/143; 210/745; 210/800
[58] Field of Search .............................. 210/94, 97, 121, 210/123, 143, 242.1, 513, 739, 745, 776, 800; 73/61.63, 61.65, 61.68, 61.69

[56] References Cited

U.S. PATENT DOCUMENTS

| 39,565 | 8/1863 | Gray . | |
|---|---|---|---|
| 275,134 | 4/1883 | Burton | 210/242.1 |
| 1,272,850 | 7/1918 | Robbins . | |
| 3,341,983 | 9/1967 | Baldenhofer et al. . | |
| 3,456,798 | 7/1969 | Urdanoff . | |
| 3,551,330 | 12/1970 | Jernqvist et al. | 210/745 |
| 3,693,795 | 9/1972 | Robinson et al. . | |
| 3,812,966 | 5/1974 | Beach et al. | 73/61.4 |
| 3,869,903 | 3/1975 | Beach et al. | 73/61.4 |
| 3,897,335 | 7/1975 | Brandt . | |
| 4,100,872 | 7/1978 | Matsuno et al. | 210/242.1 |
| 4,876,881 | 10/1989 | Pope | 210/96.1 |
| 5,106,494 | 4/1992 | Norcross | 210/123 |
| 5,421,995 | 6/1995 | Norcross | 210/242.1 |

Primary Examiner—Joseph W. Drodge
Attorney, Agent, or Firm—Lucas & Just

[57] ABSTRACT

An improved system for filtering liquids containing particles in suspension, comprising a valve system for distributing liquid, a filter and a settling tank, in which the particles suspended in the liquid can settle during various phases at decreasing rates of settling, characterised in that a device are provided for emptying the top part of the settling tank and accompanying the liquid descending in the tank, the operation of the device being delayed for at least a part of the time corresponding to the phase of maximum speed of sedimentation.

2 Claims, 3 Drawing Sheets

METHOD FOR FILTERING LIQUIDS CONTAINING PARTICLES IN SUSPENSION

This is a continuation-in-part of U.S. Ser. No. 08/081,555 filed Jun. 23, 1993 now abandoned which was a division of U.S. Ser. No. 07/891,214 filed May 29, 1992 now abandoned.

In machines, all components are interrelated so that over-dimensioning of some results in over-dimensioning of others and vice versa.

Machine tools use cooling liquids. Liquids such as petroleum or dielectrics are used in electro-erosion machines, etc., and these liquids have to be recycled to avoid wastage and thus the machine needs a continuous filter system.

One condition governing the filter system is the number of hours before the contaminating particles in suspension have settled in the settling vessel or tank before they can be used again.

The invention is mainly based on the experimental discovery that if time is allowed for the primary settling of the liquid, the top of the tank can be emptied at a speed which results in a total emptying time much lower than the conventional amount, the system being provided with means to achieve this object.

The invention concerns an improved system for filtering liquid containing particles in suspension, comprising a filter and a settling tank, in which the particles suspended in the liquid can settle during various phases at decreasing rates of settling, characterised in that means are provided for emptying the top part of the settling tank and accompanying the liquid descending in the tank, the operation of the means being delayed for at least a part of the time corresponding to the phase of maximum speed of sedimentation, and the tank being emptied at a rate near the speed of sedimentation ($V_A$) of the area in which particles settle freely (A).

According to another feature, the means comprise a pipe, the mouth of which is submerged near the surface of the liquid and is secured by floats for holding it at the same level.

It is known to use floats to hold the extraction pipe at the surface of the liquid, e.g. in discharges of petroleum into the sea or the separation of oil and petroleum above water, as in British patent No. 1,412,102.

In the present invention, use is made of a known component—i.e., floats holding the extraction tube in order to apply it to a different medium (a liquid with particles and materials in suspension) and, on the basis of the aforementioned experimental finding (the speed of settling), the top part of the liquid is extracted and also the tank containing it is emptied.

Figure 1:
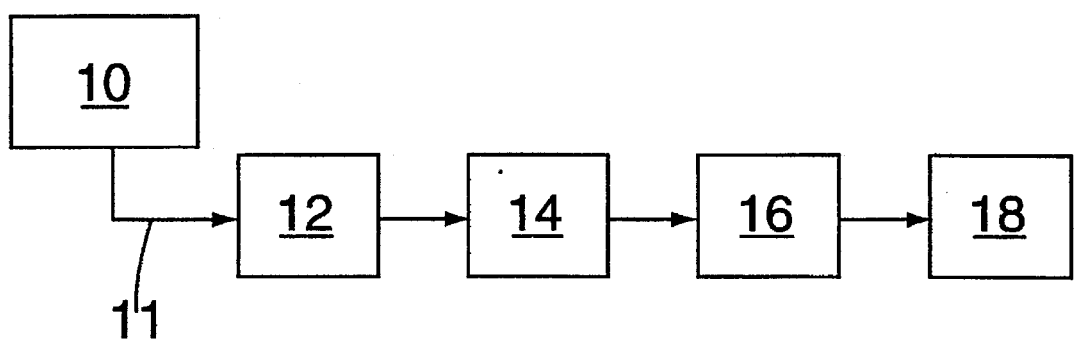
FIG. 1 is a diagram of a filtration system for liquids used in a machine tool.

In FIG. 1, the liquids used as coolants, dielectrics, etc. in a machine tool (10) become contaminated and are extracted through a pipe (11) and delivered to a tank (12) of dirty liquid.

The liquid is filtered in a filter (14) and the filtered liquid, containing particles in suspension, is delivered to a settling tank (16).

In the settling tank (16), the particles in suspension settle to the bottom of the tank so as to leave the liquid clear and ready for re-use. The clear liquid from settling tank (16) is transferred to a holding tank (18) until the clear liquid is required for the machine tool.

Separation by settling occurs through gravity, which causes the particles to descend at a speed depending on the density and viscosity of the liquid and the size, shape and density of the particle. Heavy, large particles are needed to obtain maximum efficiency in the settling process. If this does not happen naturally, preliminary coagulation and flocculation is needed. When the concentration of solids is high, the apparent density of the liquid increases and sedimentation is delayed.

Figure 2:
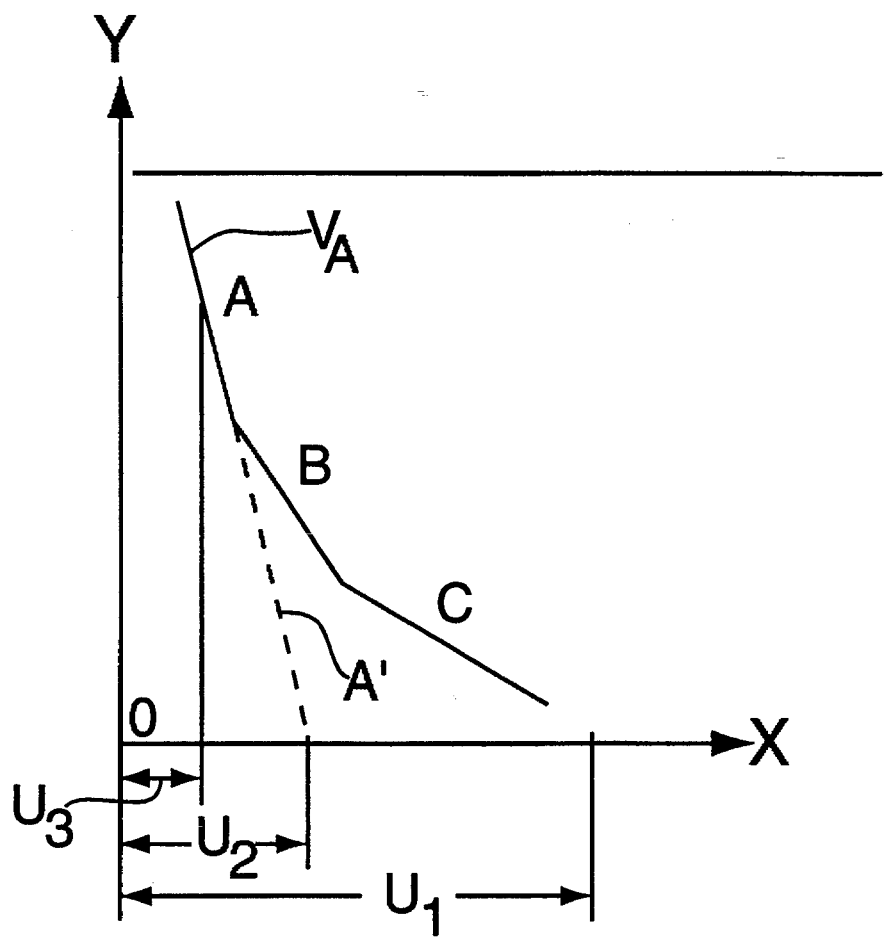
FIG. 2 shows the speed of settlement of particles in a liquid along X and Y co-ordinates.

The various phases of sedimentation are clearly shown in FIG. 2, where the OY axis denotes the level of the zone free from suspended particles and the OX axis denotes time. After a time, a free surface (similar to the surface of water and characterised by a field of gravitational force and some interactions between a certain class of particles) forms at the top, and below this surface particles settle freely (A) (unless the initial concentration is very high) whereas above this surface the water is clear. Nearer the bottom, there is a delayed sedimentation zone (B) and at the bottom there is a high-concentration zone (C), where the sludge is compressed and compacted. The free surface gradually descends until it meets the compression zone. The speed of descent progressively decreases.

If it is desired to use liquid that is in the settling tank (16) it is necessary to wait until practically all the liquid is clear, which will take many hours (U1) and affect the size and operation of the rest of the installation including the filter (4), which is usually expected to have a minimum capacity of (U1) uninterrupted hours of absorption of impurity before the settling tank (16) is again cleared.

Surprisingly, the applicant has found that if the part near the top surface (22) of the settling tank (16) is emptied at a speed related to the primary speed of sedimentation $V_A$ of the zone (A) (FIG. 2) immediately below the free zone, the speed of settling does not vary in phases (zones A, B, C, D) but remains approximately constant and similar to the primary speed of settling ($V_A$) represented in FIG. 2 by a broken-line prolongation (A') of zone (A). As can be seen, the number of hours for emptying the tank is now U2, much smaller than the original time U1, i.e. U2 <U1. In practice we have experimented with tanks in which U1 =24 h and U2 =5 h.

It has been found that in proportion as the settling tank (16) is evacuated by the system according to the invention, the speed of settling increases, i.e. the slope of the line AA' increases, so that the number of hours U is even less than the theoretical.

Accordingly the system provides means for emptying the top part of the settling tank (16) after the time (U3) required for the top part of the liquid to become clear (along the line A —e.g. 3 hours).

Figure 3:
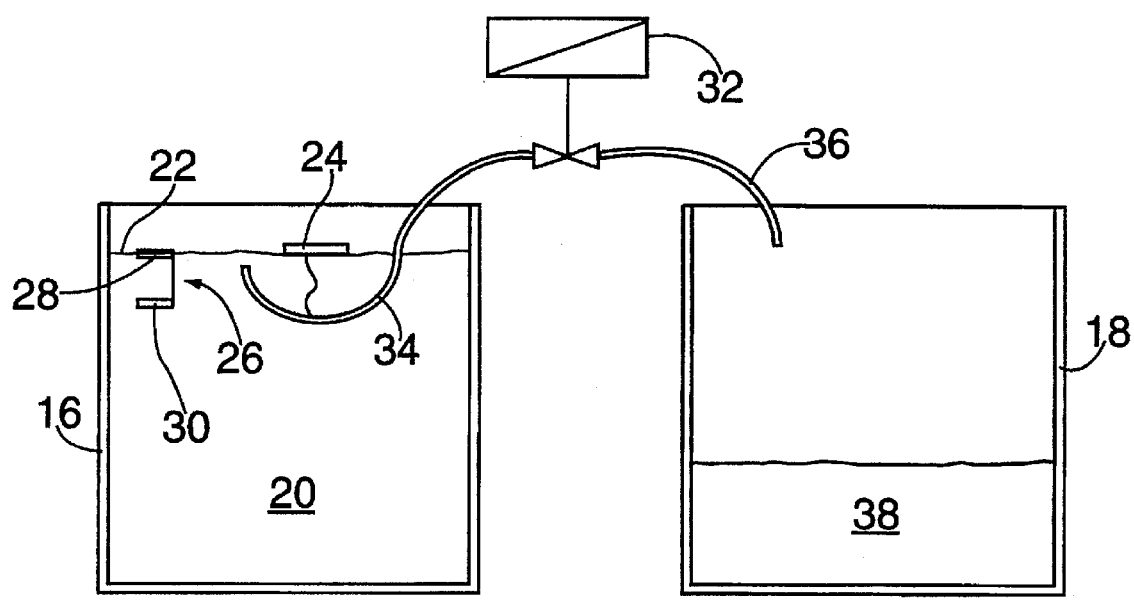
FIG. 3 shows a settling tank according to the present invention.

In FIG. 3 there is shown one method for determining the rate R and also the best mode contemplated for carrying out the present invention. Settling tank (16) and holding tank (18) are as described with respect to FIG. 1. Settling tank (16) has a liquid/particle suspension (20) which has a free surface (22) at the top thereof. Floating on the free surface (22) is float (24). A photocell (26) is attached to float (24). The photocell (26) comprises a transmitter (28) and a receiver (30). It will be appreciated that element (28) could be the receiver and that element (30) could be the transmitter. As shown, receiver (30) is positioned slightly below transmitter (28). By the term "slightly below," it is intended to mean that receiver (30) is no more than about 25% of the height of the settling tank (16) below transmitter (28). More preferably, receiver (30) is no more than about 15% of the height of the tank below transmitter (28). The term "height of the tank" means the normal level to which the settling tank (16) is filled with liquid/particle suspension, and not the overall height of the tank. Photocell (26) is electronically attached to an electrovalve (32). A drawoff pipe (34) is attached to float (24) and to electrovalve (32). A run-off pipe (36) is attached to the other end of electrovalve (32). The photocell (26) is adjusted so that it detects when the top portion of the liquid/particle suspension is substantially free of particles. The photocell may be adjusted according to the acceptable level of particles which can be recycled to machine tool (10). This can range from substantially pure liquid (no more than about 10% by weight particles, preferably no more than about 3% by weight particles and most preferably no more than about 1% by weight particles) to a completely pure liquid, it being noted that a completely pure liquid is very difficult to obtain.

When photocell (26) detects a substantially pure liquid, it sends a signal (means not shown) to electrovalve (32). Electrovalve (32) is then activated and commences draw-off of the top liquid in the liquid/particle suspension (20) by means of draw-off pipe (34). The substantially pure liquid (38) is then transferred to holding tank (18) by means of run-off pipe (36). As substantially pure liquid is drawn off from settling tank (16), float (24) and photocell (26) will descend. When photocell (26) detects that the level of particles between the transmitter (28) and the receiver (30) is too high, it will stop sending a signal to electrovalve (32) and electrovalve (32) will be turned off so that there is no further transfer of liquid from settling tank (16) to holding tank (18). When the photocell (26) again detects that the liquid between transmitter (28) and receiver (30) is substantially pure, it will again send an "on" signal to electrovalve (32) and electrovalve (32) will open and recommence transfer of substantially pure liquid (38) from settling tank (16) to holding tank (18). The on and off cycling of electrovalve (32) can be monitored and from this data the rate R can be determined. The rate R may be determined empirically or a chart or computer program may be employed based on past experimentation. Once the rate R is determined, one knows the draw-off rate for a particular settling tank (16) and the photocell and electrovalve may be removed and transferred to another settling tank to determine the rate R for that settling tank. Alternatively, the photocell (26) and electrovalve (32) may be maintained in place so that the transfer of liquid from settling tank (16) to holding tank (18) takes place whenever photocell (26) detects substantially pure liquid.

In an alternate embodiment (not shown) settling tank (16) and holding tank (18) abut and have a common wall.

The common wall can slide and emptying can occur by overflowing. However, the experiment with a draw-off pipe (34) having a mouth slightly submerged and held in position by a float (24) has given optimum results, since in this manner the mouth is constantly in the zone (A) in the diagram in FIG. 2.

It will be understood that the claims are intended to cover all changes and modifications of the preferred embodiments of the invention herein chosen for the purpose of illustration which do not constitute a departure from the spirit and scope of the invention.

What is claimed is:

1. A method for separating a liquid from a suspension of particles in a liquid, said method comprising the steps of:
   (a) determining the time T for the surface of said suspension to form a free surface;
   (b) determining the initial rate R immediately below the surface at which the particles settle freely;
   (c) commencing drawing off of liquid from above the free surface of said suspension after the elapse of time T; and
   (d) continuing the drawing off of liquid from the portion above the free surface of the suspension at said rate R until substantially all of the liquid is separated from the said suspension.

2. An apparatus for determining the rate R at which particles settle freely just below the surface of a suspension of particles in a liquid, said apparatus comprising:
   (a) a tank which holds said suspension;
   (b) a float;
   (c) a photocell comprising a transmitter and a receiver, one of which is attached to said float so that it is at the level of the float and the other of which is spaced slightly therebelow, said photocell being capable of determining when the liquid between the transmitter and receiver is substantially clear and transmitting a signal with respect to same;
   (d) on and off means responsive to said signal to commence draw off of liquid from above a free surface formed between a zone of substantially pure liquid and a zone of not substantially pure particle containing suspension when it is on and to stop draw off when it is off; whereby a determination of
   (e) the rate R based on the on and off times of said on and off means can be made.

* * * * *